United States Patent
Avati et al.

(10) Patent No.: US 9,760,577 B2
(45) Date of Patent: Sep. 12, 2017

(54) WRITE-BEHIND CACHING IN DISTRIBUTED FILE SYSTEMS

(71) Applicant: Red Hat, Inc., Raleigh, NC (US)

(72) Inventors: Anand Avati, Mountain View, CA (US); Raghavendra Gowdappa, Karnataka (IN)

(73) Assignee: Red Hat, Inc., Raleigh, NC (US)

(*) Notice: Subject to any disclaimer, the term of this patent is extended or adjusted under 35 U.S.C. 154(b) by 17 days.

(21) Appl. No.: 14/019,949

(22) Filed: Sep. 6, 2013

(65) Prior Publication Data
US 2015/0074351 A1    Mar. 12, 2015

(51) Int. Cl.
G06F 13/12    (2006.01)
G06F 13/38    (2006.01)
G06F 17/30    (2006.01)

(52) U.S. Cl.
CPC .............. G06F 17/30132 (2013.01)

(58) Field of Classification Search
CPC ................................................ G06F 17/30132
USPC .............................................................. 710/62
See application file for complete search history.

(56) References Cited

U.S. PATENT DOCUMENTS

| | | | | |
|---|---|---|---|---|
| 7,953,100 B2* | 5/2011 | Selitser et al. | ................. | 370/401 |
| 8,463,843 B2* | 6/2013 | Subbanna | ............... | H04L 47/10 |
| | | | | 709/202 |
| 2009/0268747 A1* | 10/2009 | Kurata | .................. | H04L 1/1832 |
| | | | | 370/412 |
| 2012/0131126 A1 | 5/2012 | Bandyopadhyay et al. | | |
| 2012/0215970 A1 | 8/2012 | Shats | | |
| 2012/0272236 A1 | 10/2012 | Baron | | |
| 2013/0013844 A1 | 1/2013 | Venkatesh et al. | | |
| 2013/0086324 A1 | 4/2013 | Soundararajan et al. | | |
| 2013/0117503 A1* | 5/2013 | Nellans et al. | ............... | 711/103 |
| 2013/0332610 A1* | 12/2013 | Beveridge | ..................... | 709/226 |

OTHER PUBLICATIONS

Subodh Pachghare, "What are exactly O_Direct, O_Sync Flags, Buffers & Cached in Linux-Storage I/O?;" http://www.thesubodh.com/2013/07/what-are-exactly-odirect-osync-flags.html, Jul. 7, 2013.

Vasily Tarasov et al., "Virtual Machine Workloads: The Case for New Benchmarks for NAS;" 11th UNSENIX Conference on File and Storage Technolgies (Fast '13), 14 pages; https://www.usenix.org/system/files/conference/fast13/fast13-final84.pdf.

(Continued)

Primary Examiner — Chun-Kuan Lee
(74) Attorney, Agent, or Firm — Lowenstein Sandler LLP

(57) ABSTRACT

Systems and methods for write-behind caching in distributed file systems. An example method may comprise: receiving, over a network, a direct write request referencing data to be written to a file residing on a persistent data storage device, the file containing at least part of an image of a virtual machine disk; writing, by a processing device, the data to a cache entry of a memory-resident cache, the cache entry corresponding to at least a part of the file; acknowledging the write request as completed; and committing, asynchronously with respect to the acknowledging, the cache entry to the persistent data storage device.

18 Claims, 4 Drawing Sheets

(56) References Cited

OTHER PUBLICATIONS

Mark Woods et al. "Intelligent Caching and NetApp Flash Cache", NetApp Tech OnTap; Aug. 2010, 8 pages; https://communities.netapp.com/docs/DOC-6508.
Mark Eshel et al. Panache: A Parallel File System Cache for Global File Access, IBM Almaden Research; 14 pages; https://www.usenix.org/legacy/event/fast10/tech/full_papers/eshel.pdf.
Anand Avati, "Write-Behind: Implement Causal Ordering and Other Cleanup", Oct. 1, 2012, 3 pages, http://review.gluster.org/3947.

\* cited by examiner

WRITE-BEHIND CACHING IN DISTRIBUTED FILE SYSTEMS

TECHNICAL FIELD

The present disclosure is generally related to computer systems, and is more specifically related to write-behind caching in distributed file systems.

BACKGROUND

Virtualization may be viewed as abstraction of some physical components into logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines in order to improve the hardware utilization rate. Virtualization may be achieved by running a software layer, often referred to as "hypervisor," above the hardware and below the virtual machines. A hypervisor may run directly on the server hardware without an operating system beneath it or as an application running under a traditional operating system. A hypervisor may abstract the physical layer and present this abstraction to virtual machines to use, by providing interfaces between the underlying hardware and virtual devices of virtual machines. Processor virtualization may be implemented by the hypervisor scheduling time slots on one or more physical processors for a virtual machine, rather than a virtual machine actually having a dedicated physical processor. Memory virtualization may be implemented by employing a page table (PT) which is a memory structure translating virtual memory addresses to physical memory addresses. Disk virtualization may be implemented by the host computer system storing, in a volatile or persistent memory, images of virtual machines' disks.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
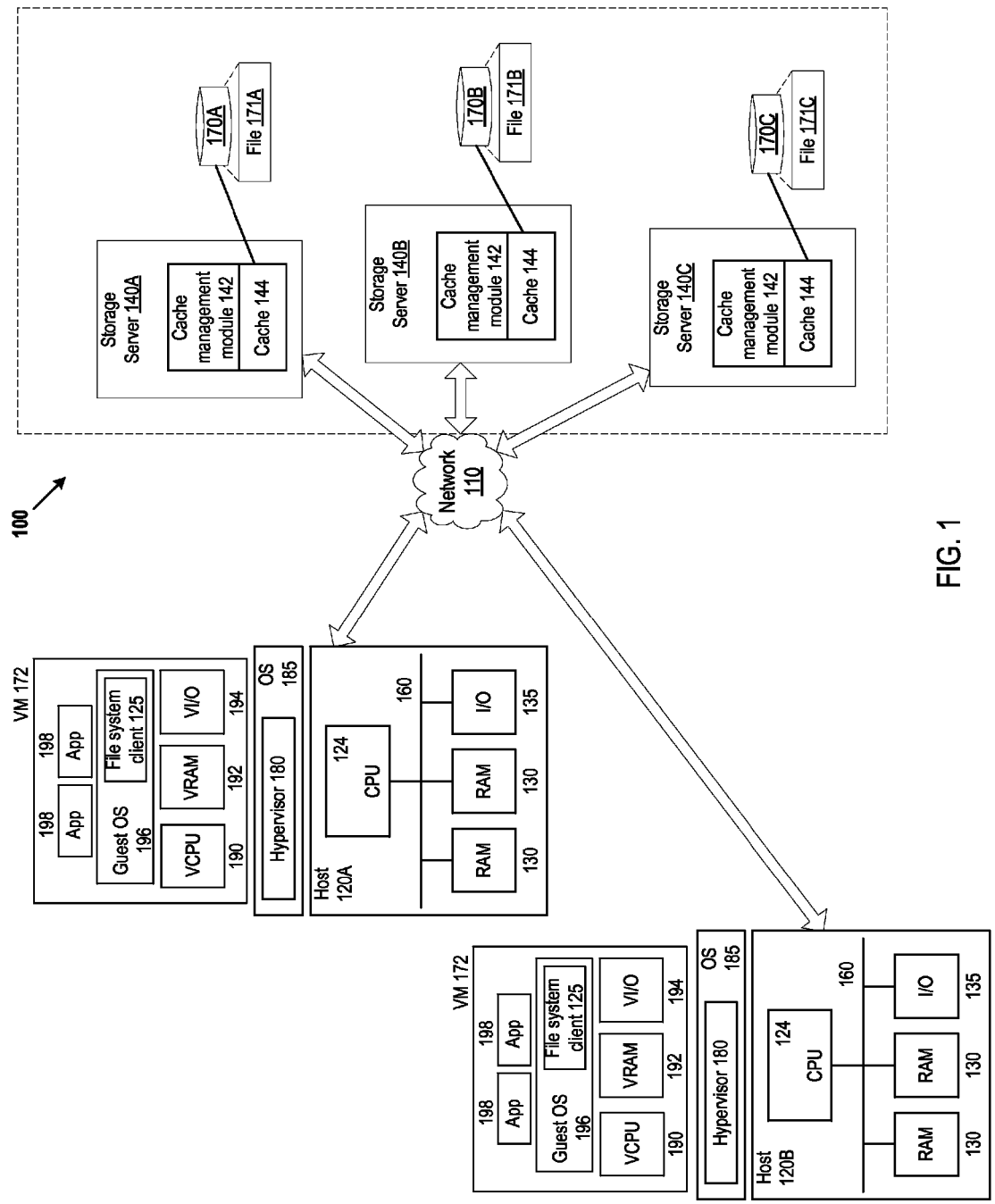
FIG. 1 schematically depicts component diagrams of example computer systems, in accordance with one or more aspects of the present disclosure.

Described herein are methods and systems for write-behind caching in distributed file systems. In an illustrative example, a distributed file system may be provided by a network attached storage (NAS) system comprising one or more storage server computer systems each coupled to one or more persistent data storage devices, such as magnetic or optical storage disks, solid-state drives (SSDs), etc. "Computer system" herein shall refer to a system comprising one or more processors, one or more memory devices, and one or more input/output (I/O) interfaces.

A storage server computer system may execute a network file system (NFS) server to manage file input/output (I/O) requests originated by NFS clients. One or more client computer systems can execute a file system client (e.g., an NFS client) to communicate with one or more storage servers. In an illustrative example, a computer system may comprise one or more virtual machines running on one or more physical servers interconnected by one or more networks.

In certain operating systems, I/O operations may by default be buffered by one or more levels of kernel memory-resident caches, in order to optimize the number data storage device access operations. In an illustrative example, a buffered write operation may comprise copying data from a user space buffer to a kernel memory-resident cache, and then asynchronously committing the cache to the data storage device.

Certain operating systems allow opening files in a direct (unbuffered) I/O mode. In Unix family of operating systems, write operations with respect to a file descriptor returned by open( ) system call with O_DIRECT flag, may, in an illustrative example, comprise copying data from a user space buffer directly to the data storage device, bypassing any file system caches. However, the data storage device (e.g., a hard disk drive) may implement its own hardware-level cache for buffering I/O requests.

The direct I/O mode may be useful, for example, for I/O operations performed by a host computer system with respect to virtual machine disk image files resident in a distributed file system. A virtual machine may implement I/O caching with respect to files residing on virtual disks, and thus the additional one or more layers of I/O caching at the host computer system level with respect to disk image files may be superfluous, since those would degrade the overall system performance and consume the system memory.

Aspects of the present disclosure address the above noted deficiencies by implementing direct I/O requests and write-behind caching with respect to virtual machine disk image files. The host computer system may open the disk image files in the direct I/O mode (e.g., using open( ) system call with O_DIRECT flag). Responsive to receiving a direct write request, the storage server may acknowledge the write request back to the requesting client, and copy the data from the user space buffer referenced by the write request to a cache entry corresponding to at least part of the file referenced by the write request. The modified cache entry may be then committed to the data storage device asynchronously with respect to acknowledging the write request to the client.

In accordance with one or more aspects of the present disclosure, using the direct write mode and write-behind caching with respect to virtual machine disk image files may lead to improving the efficiency of disk I/O operations by virtual machines, since a direct write request is acknowledged asynchronously to performing actual disk I/O operations. In certain implementations, a direct write request may be acknowledged within a period of time which is less than a pre-determined maximum time period, irrespectively of the time that might be actually elapsed before completing the actual disk I/O operations. Furthermore, using the direct write mode and write-behind caching with respect to virtual machine disk image files may lead to reducing the memory usage by the host computer system, by eliminating one or more layers of I/O caching at the host computer system level with respect to disk image files. The size of the write-behind cache simulating a drive cache may be limited by a pre-determined value (e.g., 1 Mbyte).

Various aspects of the above referenced methods and systems are described in details herein below by way of examples, rather than by way of limitation.

FIG. 1 schematically depicts a high-level component diagram of an example distributed storage system 100 in accordance with one or more aspects of the present disclosure. In certain implementations, system 100 may be provided by a network attached storage (NAS) system comprising one or more storage servers 140A-C communicatively coupled to one or more mass storage devices 170A-C, such as magnetic or optical storage based disks, solid-state drives (SSDs) or hard drives.

In an illustrative example, distributed storage system 100 can be communicatively coupled to one or more host computer systems 120A-120B via one or more networks 110. Each of networks 110 can be provided by one or more local area networks, one or more wide area networks, or any combination thereof.

Host computer system 120A-120B may include one or more physical processors 124 communicatively coupled to memory devices 130 and input/output (I/O) devices 135. "Processor" herein shall refer to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU). "Memory device" herein shall refer to a volatile or non-volatile memory device, such as RAM, ROM, EEPROM, or any other device capable of storing data. "I/O device" herein shall refer to a device capable of providing an interface between one or more processor pins and an external device capable of inputting and/or outputting binary data.

Host computer systems 120A-120B may run virtual machines 172, by executing a software layer 180, often referred to as "hypervisor," above the hardware and below the virtual machines. In an illustrative example, the hypervisor 180 may be a component of the operating system 185 executed by the host computer system 100. Alternatively, the hypervisor 180 may be provided by an application running under the host operating system 185, or may run directly on the host computer system 100 without an operating system beneath it. The hypervisor 180 may abstract the physical layer, including processors, memory, and I/O devices, and present this abstraction to virtual machines 172 as virtual devices, including virtual processors 190, virtual memory 192, and virtual I/O devices 194. In an illustrative example, host computer systems 120A-120B may execute file system clients 125 to communicate with storage servers 140A-140C of distributed file system 100.

A virtual machine 172 may execute a guest operating system 196 which may utilize the underlying virtual devices 190, 192, and 194, each of which may map to a device of the host machine (e.g., a processor, a memory device, a network interface card, etc.). One or more applications 198 may be running on a virtual machine 172 under the guest operating system 196.

In certain implementations, disk virtualization may be implemented by host computer systems 120A-120B storing images of virtual machines' disks as files 171A-171C in distributed storage system 100. In an illustrative example, an image of a virtual disk may be stored in one or more files in distributed storage system 100.

A virtual machine 172 may implement I/O caching with respect to files residing on virtual disks, and thus any additional layers of I/O caching at the host computer system level with respect to disk image files may be superfluous, since those would degrade the overall system performance and consume the system memory. To avoid unnecessary caching, host computer system 120 may open the disk image files in the direct I/O mode (e.g., using open( ) system call with O_DIRECT flag).

In an illustrative example, write operations with respect to a file descriptor returned by open( ) system call with O_DIRECT flag, may comprise copying data from a user space buffer owned by a client process (e.g., by application 198) directly to the data storage device, bypassing any file system caches. Storage server 140 may simulate a drive cache by executing a cache management module 142 to implement write-behind caching with respect to direct write requests.

"Write-behind caching" herein shall refer to a method of I/O requests caching comprising creating or modifying a cache entry in response to receiving a write request, and asynchronously, with respect to receiving the write request, writing modified cache entries to the persistent storage. In certain implementations, a write-behind cache 144 may be resident in a kernel non-cacheable memory of the storage server computer system.

Figure 2:
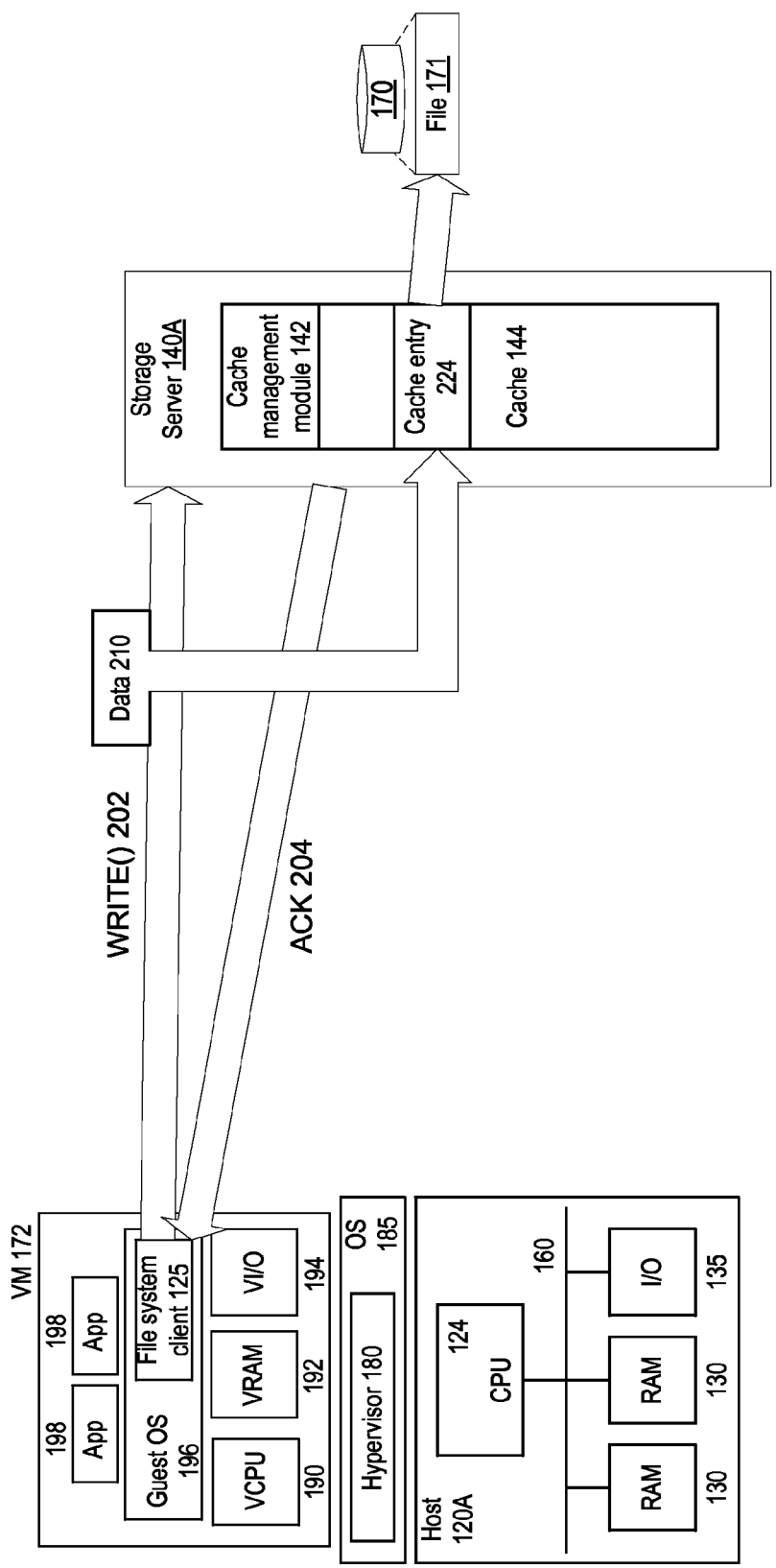
FIG. 2 schematically illustrates servicing a direct write request by a storage server operating in accordance with one or more aspects of the present disclosure.

As schematically illustrated by FIG. 2, a direct write request 202 may be originated by a file system client 125 executed by a host computer system 120. Responsive to receiving the direct write request 202, storage server 140 may transmit an acknowledgement 204 back to requesting client 125, and copy data 210 from a user space buffer referenced by the write request to a cache entry 224 corresponding to at least part of the file 171 referenced by the write request. The modified cache entry 224 may be then committed to the data storage device 170 asynchronously with respect to transmitting acknowledgement 204 back to requesting client 125. In certain implementations, the overall size of cache 144 may be limited by a pre-defined value (e.g., 1 MB).

In certain implementations, a direct write request may be acknowledged within a period of time which is less than a pre-determined maximum time period, irrespectively of the time that might be actually elapsed before completing the actual disk I/O operations. In an illustrative example, acknowledging the write request may be performed responsive to receiving the write request. Alternatively, acknowledging the write request may be performed responsive to writing the data to the cache entry.

In an illustrative example, writing the data to the cache entry may comprise creating a new cache entry corresponding to at least a part of the file referenced by the write request. In another illustrative example, writing the data to the cache entry may comprise modifying the contents of an existing cache entry corresponding to at least a part of the file referenced by the write request.

In certain implementations, the storage server may maintain a write-behind queue comprising referenced to the write-behind cache entries that need to be committed to the data storage device. Responsive to modifying a cache entry, reference to the cache entry may be added to the queue. The storage server may then retrieve cache entry references from the write-behind queue within a specified time period elapsed from updating the corresponding cache entry, so that the data on the data storage device would not lag behind the cache by more than the specified time period.

In certain implementations, simultaneous or overlapping in time write requests related to the same file or same part of a file may be serialized by the storage server. In an illustrative example, if a new write request is received with respect to the same file or part of a file as a pending write request, the new write request may be serialized and acknowledged only after the pending write has been committed to the storage device.

Thus, using the direct write mode and write-behind caching with respect to virtual machine disk image files may lead to improving the efficiency of disk I/O operations by virtual machines, since a direct write request is acknowledged asynchronously to performing actual disk I/O operations. Furthermore, using the direct write mode and write-behind caching with respect to virtual machine disk image files may lead to reducing the memory usage by the host computer system, by eliminating one or more layers of I/O caching at the host computer system level with respect to disk image files.

Figure 3:
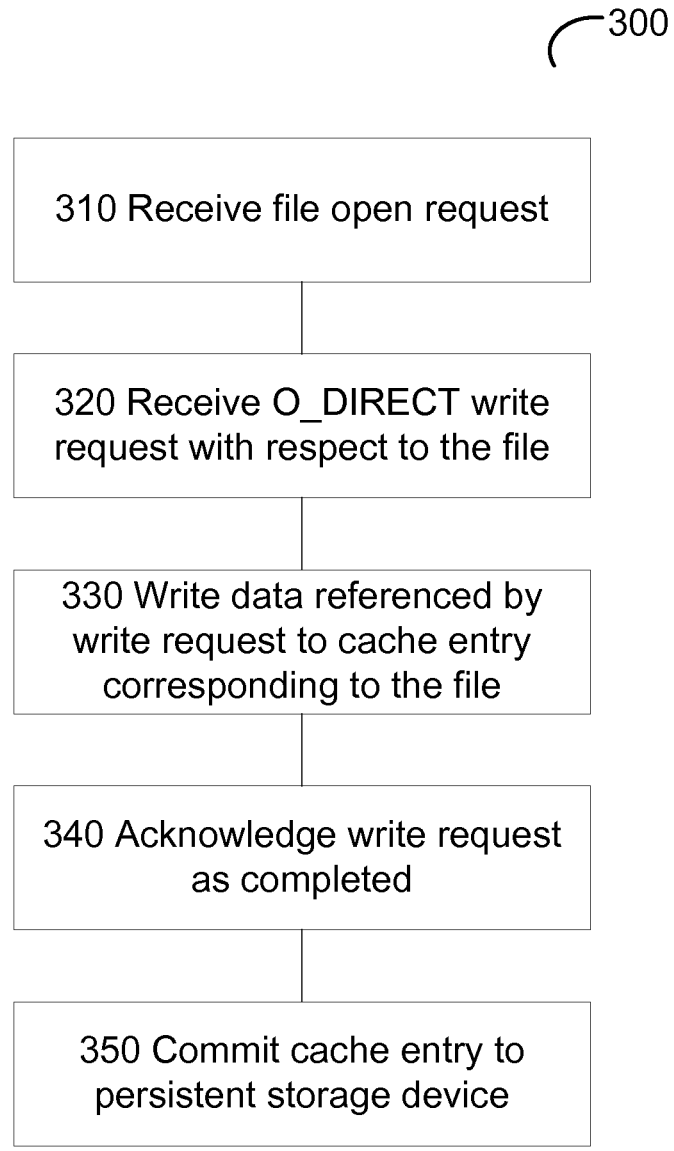
FIG. 3 depicts a flow diagram of an example method for write-behind caching in distributed file systems, in accordance with one or more aspects of the present disclosure.

FIG. 3 depicts a flow diagram of an example method 300 for write-behind caching in distributed file systems. The method 300 may be performed by a computer system (e.g., system management computer 194) that may comprise hardware (e.g., circuitry, dedicated logic, and/or programmable logic), software (e.g., instructions executable on a computer system to perform hardware simulation), or a combination thereof. The method 300 and/or each of its individual functions, routines, subroutines, or operations may be performed by one or more processors of the computer system executing the method.

At block 310, a storage server may receive a file open request with respect to a file residing on a persistent data storage device communicatively coupled to the storage server. In an illustrative example, the file may contain at least part of a disk image of a virtual machine disk, and the file open request may be originated by a host computer system running the virtual machine. In another illustrative example, the file open request may comprise a flag (e.g., O_DIRECT flag defined in certain Unix-family operating systems) indicating a direct (unbuffered) I/O mode in performing subsequent write operations with respect to the file being opened.

At block 320, the storage server may receive a write request with respect to the file opened at block 310. The write request may reference a buffer containing data to be written to the file. In illustrative examples, the data to be written to the file may represent textual, binary, and/or user-defined type data.

At block 330, the storage server may write the data to a cache entry corresponding to at least part of the file. In certain implementations, a cache entry may correspond to one or more units of persistent storage (e.g., one or more disk blocks having a pre-defined fixed size). Alternatively, a cache entry may correspond to a file.

In an illustrative example, the storage server may create a new entry within a memory-resident write-behind cache, if a cache entry corresponding to a file or a portion of a file being updated is not present in the cache. Alternatively, the storage server may modify an existing cache entry, if a cache entry corresponding to a file or a portion of a file being updated is already present in the cache.

At block 340, the storage server may transmit a message back to the requesting client to acknowledge the write request as completed. In an illustrative example, acknowledging the write request may be performed responsive to receiving the write request (before writing the data to the cache entry is completed), as schematically denoted by block 320. Alternatively, acknowledging the write request may be performed responsive to writing the data to the cache entry (once writing the data to the cache entry is completed), as schematically denoted by block 330.

At block 350, the storage server may, asynchronously with respect to the acknowledging, commit the cache entry to the persistent data storage device. Upon completing the operations referenced by block 350, the method may terminate.

Figure 4:
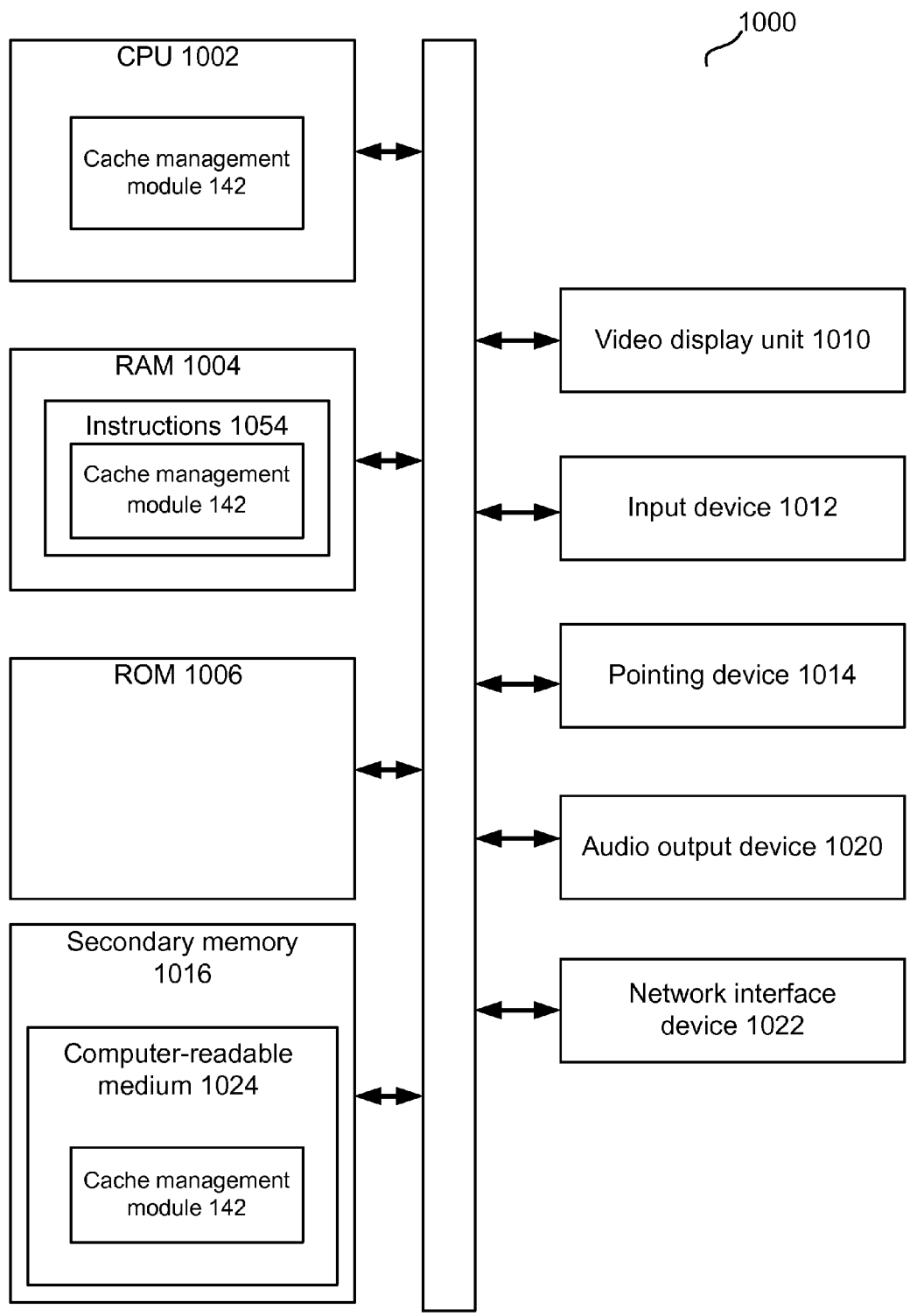
FIG. 4 depicts an illustrative computer system operating in accordance with in accordance with one or more aspects of the present disclosure.

FIG. 4 depicts an illustrative computer system operating in accordance with examples of the present disclosure. In one example, computer system 1000 may correspond to storage server 140A-140C of FIG. 1.

In one example, the computer system 1000 may be connected (e.g., via a network, such as a Local Area Network (LAN), an intranet, an extranet, or the Internet) to other computer systems (e.g., other nodes). Computer system 1000 may operate in the capacity of a server or a client computer in a client-server environment, or as a peer computer in a peer-to-peer or distributed network environment. Computer system 1000 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 1000 may include a processor 1002, a volatile memory 1004 (e.g., random access memory (RAM)), a non-volatile memory 1006 (e.g., read-only memory (ROM) or electrically-erasable programmable ROM (EEPROM)), and a storage memory 1016 (e.g., a data storage device), which may communicate with each other via a bus 1008.

The processor 1002 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

The computer system 1000 may further include a network interface device 1022. The computer system 1000 also may include a video display unit 1010 (e.g., an LCD), an alphanumeric input device 1012 (e.g., a keyboard), a pointing device 1014 (e.g., a mouse), and an audio output device 1020 (e.g., a speaker).

The secondary memory 1016 may include a tangible computer-readable storage medium 1024 on which may be stored instructions 1054 encoding cache management module 142 implementing write-behind caching with respect to direct write requests. The instructions 1054 may also reside, completely or partially, within the main memory 1004 and/or within the processor 1002 during execution thereof by the computer system 1000, hence, the main memory 1004 and the processor 1002 may also constitute machine-readable storage media.

While the computer-readable storage medium 1024 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICs, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

Unless specifically stated otherwise, terms such as "updating", "identifying", "determining", "sending", "assigning", or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform the method 300 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

The invention claimed is:

1. A method, comprising:
   receiving, over a network, a direct write request referencing data to be written to a file residing on a persistent data storage device, the file containing at least part of an image of a virtual machine disk;
   writing, by a processing device, the data to a cache entry of a memory-resident cache, the cache entry corresponding to at least a part of the file;
   appending, by the processing device, an identifier of the cache entry to a queue of cache entries to be committed to the persistent data storage device;
   acknowledging the write request as completed;
   retrieving, within a specified time period after writing the data to the cache entry, the identifier of the cache entry from the queue; and
   committing, responsive to the retrieving, the cache entry to the persistent data storage device.

2. The method of claim 1, further comprising receiving an open request with respect to the file, the open request comprising an O_DIRECT flag.

3. The method of claim 1, wherein writing the data to the cache entry comprises one of: creating a new cache entry, or modifying an existing cache entry.

4. The method of claim 1, wherein committing the cache entry is performed within a pre-defined period of time following writing the data to the cache entry.

5. The method of claim 1, further comprising:
   receiving, before committing the cache entry modified responsive to the first write request, a second direct write request with respect to the file;
   writing data referenced by the second direct write request to a second cache entry of the memory-resident cache; and
   acknowledging the second write request as completed responsive to committing the cache entry modified responsive to the first write request.

6. The method of claim 1, wherein the cache entry corresponds to one or more blocks of the persistent data storage device.

7. The method of claim 1, wherein the memory-resident cache is resident in a kernel non-cacheable memory.

8. The method of claim 1, further comprising:
   reading the data to be written to the file from a user space buffer specified by the direct write request.

9. A system, comprising:
   a memory to store a memory-resident cache; and
   a processing device, operatively coupled to the memory, to:
   receive, over a network, a direct write request referencing data to be written to a file residing on a persistent data storage device, the file containing at least part of an image of a virtual machine disk;
   write the data to a cache entry of the memory-resident cache, the cache entry corresponding to at least a part of the file;
   append an identifier of the cache entry to a queue of cache entries to be committed to the persistent data storage device;
   acknowledge the write request as completed;
   retrieve, within a specified time period after writing the data to the cache entry, the identifier of the cache entry from the queue; and
   commit, responsive to the retrieving, the cache entry to the persistent data storage device.

10. The system of claim 9, wherein the processing device is further to receive an open request with respect to the file, the open request comprising an O_DIRECT flag.

11. The system of claim 9, wherein the processing device is to commit the cache entry within a pre-defined period of time following writing the data to the cache entry.

12. The system of claim 9, wherein the memory-resident cache has a size not exceeding a pre-determined value.

13. The system of claim 9, wherein the processing device is further to:
receive, before committing the cache entry modified responsive to the first write request, a second direct write request with respect to the file;
write data referenced by the second direct write request to a second cache entry of the memory-resident cache;
acknowledge the second write request as completed responsive to committing the cache entry modified responsive to the first write request.

14. A non-transitory computer-readable storage medium comprising executable instructions to cause a processing device to:
receive, over a network, a direct write request referencing data to be written to a file residing on a persistent data storage device, the file containing at least part of an image of a virtual machine disk;
write, by the processing device, the data to a cache entry of a memory-resident cache, the cache entry corresponding to at least a part of the file;
append, by the processing device, an identifier of the cache entry to a queue of cache entries to be committed to the persistent data storage device;
acknowledge the write request as completed;
retrieve, within a specified time period after writing the data to the cache entry, the identifier of the cache entry from the queue; and
commit, responsive to the retrieving, the cache entry to the persistent data storage device.

15. The non-transitory computer-readable storage medium of claim 14, further comprising executable instructions to cause the processing device to:
receive an open request with respect to the file, the open request comprising an O_DIRECT flag.

16. The non-transitory computer-readable storage medium of claim 14, wherein writing the data to the cache entry comprises one of: creating a new cache entry, modifying an existing cache entry.

17. The non-transitory computer-readable storage medium of claim 14, wherein committing the cache entry is performed within a pre-defined period of time following writing the data to the cache entry.

18. The non-transitory computer-readable storage medium of claim 14, further comprising executable instructions to cause the processing device to:
receive, before committing the cache entry modified responsive to the first write request, a second direct write request with respect to the file;
write data referenced by the second direct write request to a second cache entry of the memory-resident cache; and
acknowledge the second write request as completed responsive to committing the cache entry modified responsive to the first write request.

* * * * *